United States Patent
Buttrick, Jr.

(10) Patent No.: US 9,377,152 B2
(45) Date of Patent: Jun. 28, 2016

(54) METHOD AND APPARATUS FOR POSITIONING AUTOMATED PROCESSING SYSTEMS

(71) Applicant: The Boeing Company, Chicago, IL (US)

(72) Inventor: James N. Buttrick, Jr., Seattle, WA (US)

(73) Assignee: The Boeing Company, Chicago, IL (US)

(*) Notice: Subject to any disclaimer, the term of this patent is extended or adjusted under 35 U.S.C. 154(b) by 608 days.

(21) Appl. No.: 13/837,118

(22) Filed: Mar. 15, 2013

(65) Prior Publication Data

US 2014/0263934 A1    Sep. 18, 2014

(51) Int. Cl.
*B61B 10/04* (2006.01)
*F16M 3/00* (2006.01)
*B25J 5/04* (2006.01)

(52) U.S. Cl.
CPC .... *F16M 3/00* (2013.01); *B25J 5/04* (2013.01)

(58) Field of Classification Search
CPC ...... B61B 10/00; B61B 10/001; B61B 10/04; B61B 10/043; B61B 10/046
USPC ..................... 104/88.01–88.06, 96
See application file for complete search history.

(56) References Cited

U.S. PATENT DOCUMENTS

| | | | |
|---|---|---|---|
| 5,358,568 A * | 10/1994 | Okano | B05B 13/005 118/317 |
| 6,843,328 B2 | 1/2005 | Boyl-Davis et al. | |
| 7,216,408 B2 | 5/2007 | Boyl-Davis et al. | |
| 2011/0214586 A1 | 9/2011 | Wessel et al. | |

FOREIGN PATENT DOCUMENTS

| | | |
|---|---|---|
| EP | 2 090 506 A1 | 8/2009 |
| JP | 60-219194 A | 11/1985 |

OTHER PUBLICATIONS

FDH Flexible Drilling Head, mTorres Aeronautics Division, Aug. 2009.
International Search Report and Written Opinion mailed Jun. 20, 2014 for PCT/US2014/016315, 8 pages.

* cited by examiner

*Primary Examiner* — R.J. McCarry, Jr.
(74) *Attorney, Agent, or Firm* — Smith Moore Leatherwood LLP

(57) ABSTRACT

Apparatuses and methods for positioning an automated processing system, coupled with a track, are disclosed. The apparatus includes an automated chassis having drive, steering, elevation, and track-gripping components actuated by an onboard controller to permit the chassis to carry a processing system together with its track from one location to another about a work surface.

23 Claims, 15 Drawing Sheets

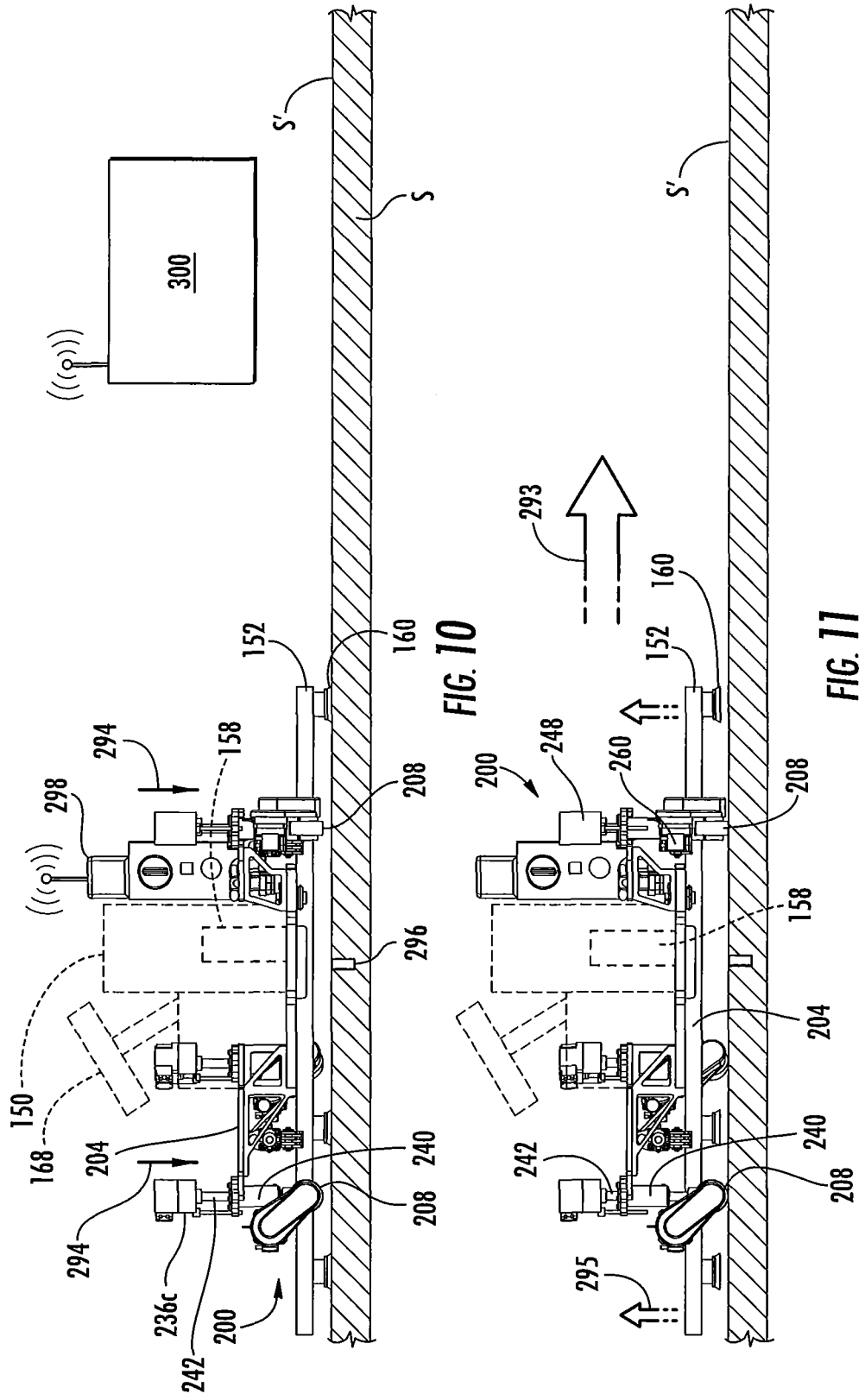

METHOD AND APPARATUS FOR POSITIONING AUTOMATED PROCESSING SYSTEMS

BACKGROUND

Automated processing systems may be used in the aerospace industry, as well as in other manufacturing sectors, for fabricating, maintaining, inspecting, etc. various components, assemblies, and/or sub-assemblies. These processing systems may be configured to move about surfaces, including surfaces of components being fabricated. For example, in aircraft manufacturing, manual and automated processing systems, supported on guide tracks attached to a work surface, may be moved relative to the work surface and may be configured to be accurately positioned at a location where processing, such as machining, assembly, inspection, maintenance, etc. is to be performed.

Automated processing systems may be configured to move relative to the surfaces of components for processing thereof, and in so doing, these systems may move along one or more elongated supporting and/or guide tracks (which could be rigid or flexible) of finite length. The finite length of the tracks limits the effective working area in which the system may operate. Accordingly, upon completion of the processing in a particular working area, the track and the automated processing system may need to be removed from a first location and repositioned at a second location if additional processing at the second location is desired.

Over time, the use of a processing system, such as one of those referenced above, may require numerous repositionings and set-ups thereof. Such a processing system can be relatively heavy and require significant manual effort and/or equipment, such as carts, hand trucks, and/or hoists to reposition the processing system and the associated tracks. Accordingly, repeated manual set-up steps of the processing system and tracks at different locations along the work surface may become unnecessarily time-consuming, manpower and/or equipment intensive, expensive, and/or involve other difficulties.

Further limitations and disadvantages of conventional and traditional approaches may become apparent to one of skill in the art, through comparison of such systems with teachings and examples set forth in the present disclosure.

SUMMARY

It would be desirable to provide a method and apparatus that address at least some of the issues discussed above, as well as other potential issues. Moreover, it would be beneficial to furnish a method and apparatus for positioning and repositioning processing systems, and the associated guide and/or supporting tracks along which such systems operate, in an automated manner that reduces set-up time, labor usage and/or the use of lifting and/or transport equipment. As used herein, "track" or "tracks" means an elongated structure which guides and/or supports a processing machine.

Accordingly, methods and apparatuses are disclosed for positioning and repositioning processing systems and the associated tracks on which such systems are carried, about work surfaces in an automated manner, substantially as shown in and/or described in connection with at least one of the figures, and as set forth more completely in the claims.

Examples of the present disclosure are generally directed to a method and apparatus for positioning processing systems. Generally, in an example implementation, an apparatus for positioning an automated processing system, movable along a track, includes a chassis configured to be coupled to the processing system and the track and at least three wheel assemblies coupled to the chassis. Each of the wheel assemblies may include: a wheel; first means for driving the wheel; second means for steering the wheel, and third means for adjusting spacing between the wheel and the chassis. Additionally, a fourth means may be provided for controlling the first, second, and third means, and a fifth means may be provided for gripping the track. Also, the fourth means could control the fifth means.

In another example implementation, an apparatus includes an automated carriage, or chassis, having drive, steering, elevation, and track-gripping components that are actuated by an onboard controller to permit the chassis to carry a processing system together with its track from one location to another about a work surface. Jaws are attached to the chassis and selectively grip and elevate the track above the work surface as the processing system is carried to an initial or subsequent location. Wheel assemblies connected to the chassis include lift components that elevate and lower the chassis and jaws, and the wheel assemblies are each individually drivable and steerable to propel the chassis. The chassis' movement may be controlled by the controller acting through the wheel assemblies and may include rectilinear, curvilinear, rotational, and/or translational motion about the surface.

In another example implementation, an apparatus is disclosed for positioning an automated processing system that has a track engageable with a surface. One example includes an apparatus having a chassis that selectively carries the automated processing system and the track. At least three wheels are connected to the chassis that selectively support the chassis on the surface and selectively permit movement of the chassis about the surface. A drive component is operably connected to the wheels and selectively propels the wheels to move the chassis about the surface. A lift component selectively moves the chassis between a first position and a second position, where the second position is further from the surface than the first position. And, a gripping component is connected to the chassis that selectively moves with respect to the track between a first position engaging the track and a second position substantially disengaged from the track.

In another example, an apparatus may include at least one controller operably connected to a drive component, a lift component, and a gripping component that selectively actuates: the gripping component to move from the first position to the second position to engage the track; the lift component to move a chassis from a first position to a second position; and a drive component to propel wheels to move the chassis together with the automated processing system and the track about a surface to a predetermined position.

In other examples, an apparatus may include wheels and at least one controller operably connected to a drive component, which includes a first motor that propels the wheels and a second motor that steers the wheels. The controller may be configured to selectively propel and direct the chassis to the predetermined position by actuating the first motor and the second motor. Such steering may be performed by moving the chassis via translational motion to the predetermined position. Additionally, the wheels may include omni wheels, and the drive component may include a differential drive instead of or in addition to the first and second motors.

Yet another implementation includes a gripping component, which, upon being in a first position, substantially fixes the chassis against movement with respect to a track, and upon being in a second position, permits movement of the chassis with respect to the track.

Another implementation may include a chassis, which, upon being in a first position, includes wheels that substantially engage the surface, and in a second position, the wheels are substantially disengaged from the surface.

Further examples may include use of wheels having suction cups that attach the wheels to the surface.

In one example, an apparatus may include a location transceiver connected to a controller that receives and transmits information regarding the location of the chassis and a reference transceiver, which could be a global positioning system (GPS) transceiver, a local and/or remote metrology device, etc., that receives information from the location transceiver regarding the location of the chassis and that transmits to the location transceiver reference information.

In another example implementation, an automated processing system is disclosed that moves about a surface, and includes a track attached to the surface with one or more attachment devices, including without limitation, one or more combination suction cup-pressurized air devices. An end effector is associated with the track and is moveable relative thereto and selectively processes the surface. An actuator selectively moves the end effector with respect to the track, and a chassis may be provided that selectively supports the end effector and the track. At least three wheels may be connected to the chassis that support the chassis on the surface and selectively permit movement of the chassis about the surface. A drive component may be operably connected to the wheels that selectively propels the wheels to move the chassis about the surface. A lift component may be included that selectively moves the chassis between a lowered position generally proximate the surface and a second position spaced away from the surface. A gripping component may be connected to the chassis that selectively moves between a first position engaging the track and a second position disengaged from the track. And, at least one controller may be operably connected to the drive component, the lift component, and the gripping component that may selectively cause: the gripping component to move from the first position to the second position to engage the track; the lift component to move the chassis from the first position to the second position; and the drive component to propel the wheels to move the chassis together with the end effector and the track about the surface to a predetermined position.

Still another example implementation of the present disclosure may include an apparatus for positioning a device that travels along a track engageable with a surface, the apparatus having a chassis that selectively carries the device and the track and at least three wheels connected to the chassis that selectively support the chassis on the surface and selectively permit movement of the chassis about the surface. A drive component may be operably connected to the wheels that selectively propels the wheels to move the chassis about the surface, and a lift component may be included that selectively moves the chassis between a first position and a second position, where the second position is further from the surface than the first position. A gripping component can be connected to the chassis that selectively moves between a first position engaging the track and a second position disengaged from the track. Additionally, at least one controller may be operably connected to the drive component, the lift component, and the gripping component to selectively actuate: the gripping component to move from the first position to the second position to engage the track; the lift component to move the chassis from the first position to the second position; and the drive component to propel the wheels to move the chassis together with the device and the track about the surface to a predetermined position.

Additionally, an example implementation includes a method of positioning an automated system that travels along a track attachable to a surface and may include providing a chassis configured to carry the automated system and the track, with the chassis having wheels that selectively support the chassis on the surface and permit movement of the chassis about the surface, including: detaching the track from the surface; engaging the track with a gripping component connected to the chassis for moving the track with the chassis; lifting the chassis and the gripping component and track therewith from the surface; and propelling the wheels with a drive component to move the chassis together with the automated processing system and the track about the surface to a predetermined position.

Moreover, an example implementation may include selectively steering the wheels to position the chassis at the predetermined position and/or providing omni wheels and an omni wheel actuator for actuating the omni wheels and actuating the omni wheels with the omni wheel actuator to cause the chassis to move via translational motion to the predetermined position. Also, the step of engaging the track with the gripping component may include substantially fixing the chassis against movement with respect to the track and disengaging the track from the gripping component to permit movement of the chassis with respect to the track upon the chassis being at the predetermined location. Further, prior to the step of propelling the wheels with a drive component, the wheels may be advanced to the surface such that the wheels engage the surface, and upon the chassis being at the predetermined location on the surface, substantially retracting the wheels such that the wheels substantially disengage from the surface. The method may also include, prior to the step of detaching the track from the surface, disengaging the gripping component to deposit the track at a first position on the surface and releasably attaching the track at the first position on the surface.

Still further, an example implementation of a method may include: providing a chassis location transmitter associated with the chassis and a chassis location receiver; transmitting information to a location reference regarding the position of the chassis using the chassis location transmitter; receiving the location reference information regarding the position of the chassis from the location reference using the chassis location receiver; and verifying whether the chassis is at the predetermined position on the surface using the location reference information. Other exemplary methods could include: providing a location reference; providing a location reference receiver for receiving information from the chassis location transmitter and a location reference transmitter for transmitting to the chassis location transmitter location reference information; receiving chassis location information from the chassis location transmitter using the location reference receiver; transmitting location reference information to the chassis location receiver using the location reference transmitter; and verifying whether the chassis is at the predetermined position on the surface using the location reference information transmitted by the location reference transmitter.

In other exemplary aspects of the disclosure, methods apparatuses are provided for positioning processing systems, and the tracks on which such systems are carried, about work surfaces in an automated manner.

The features, functions and advantages discussed herein may be achieved independently in various examples or may be combined in yet other exemplary aspects of the disclosure, the further details of which may be seen with reference to the following description and drawings.

BRIEF DESCRIPTION OF THE DRAWINGS

Figure 1:
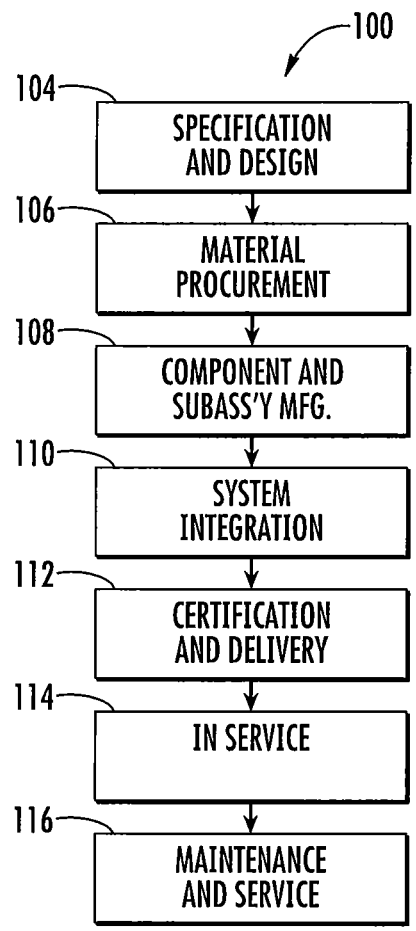
Figure 2:
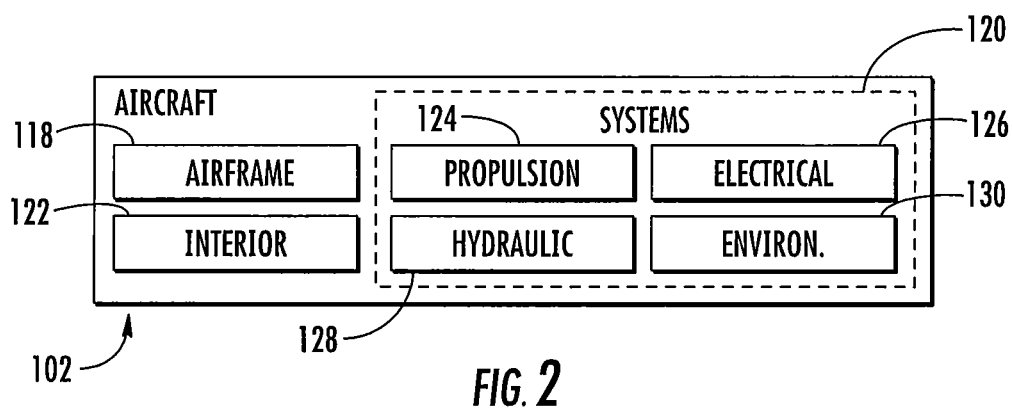
Figure 3:
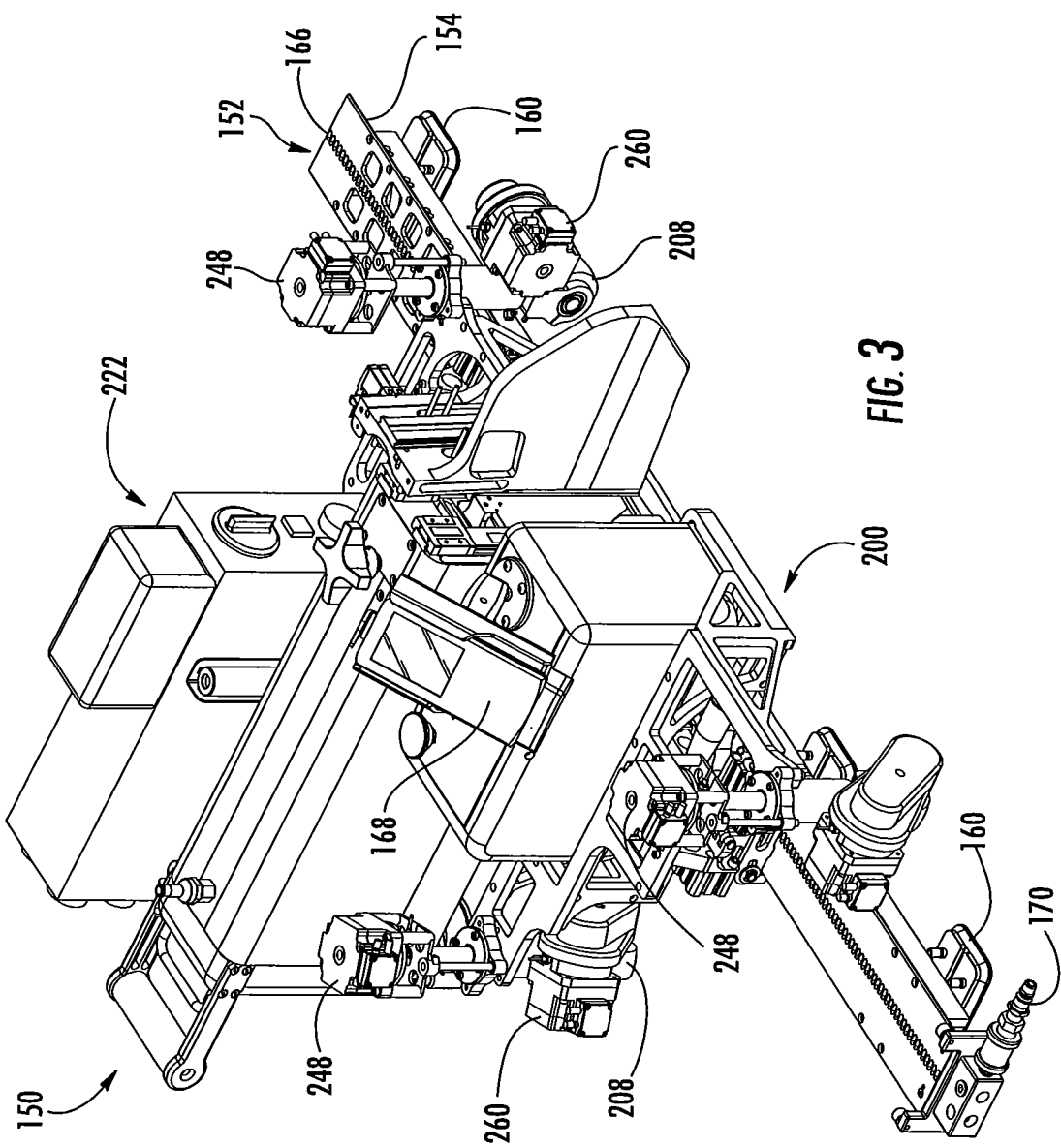
Figure 4:
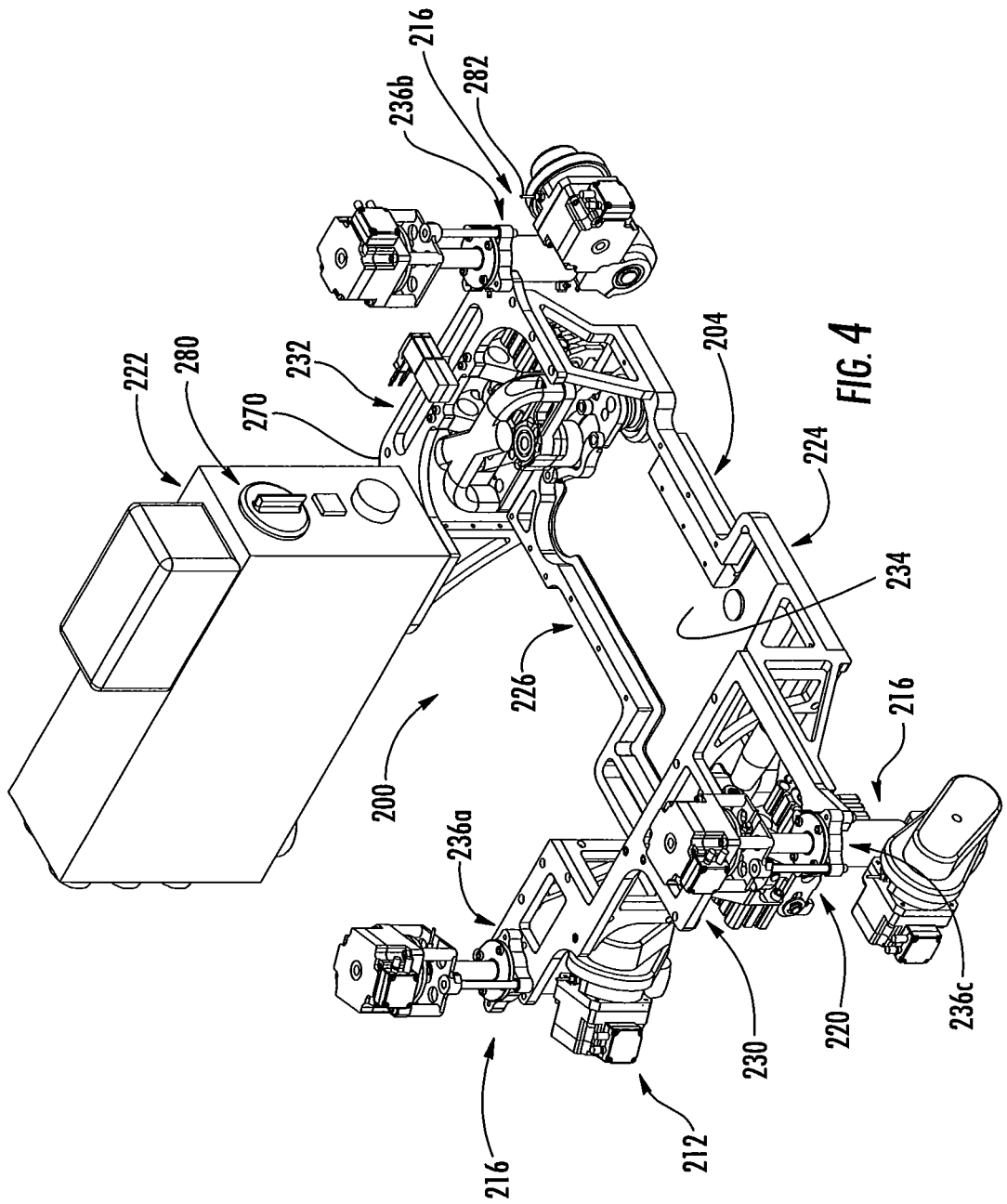
Figure 5:
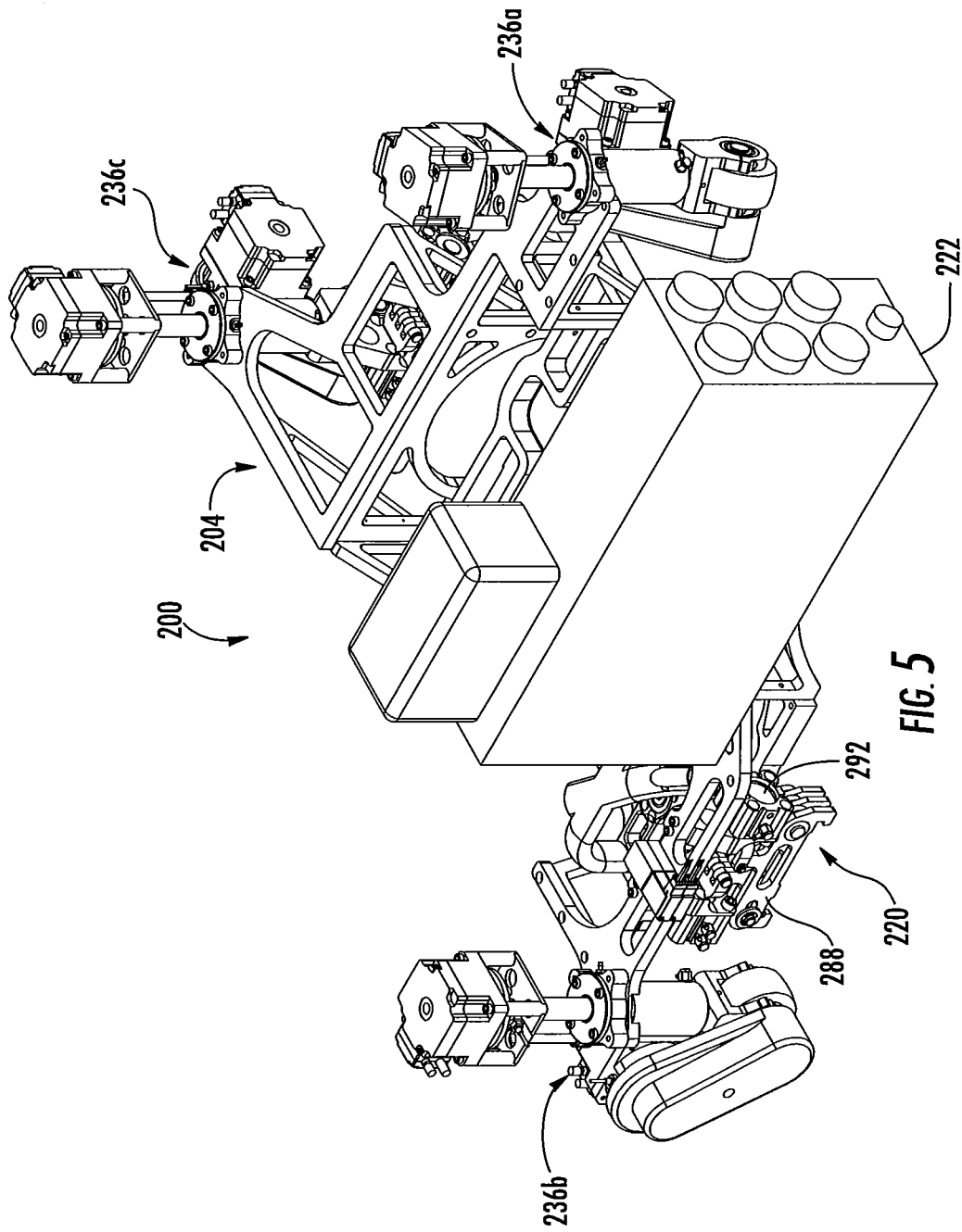
Figure 6:
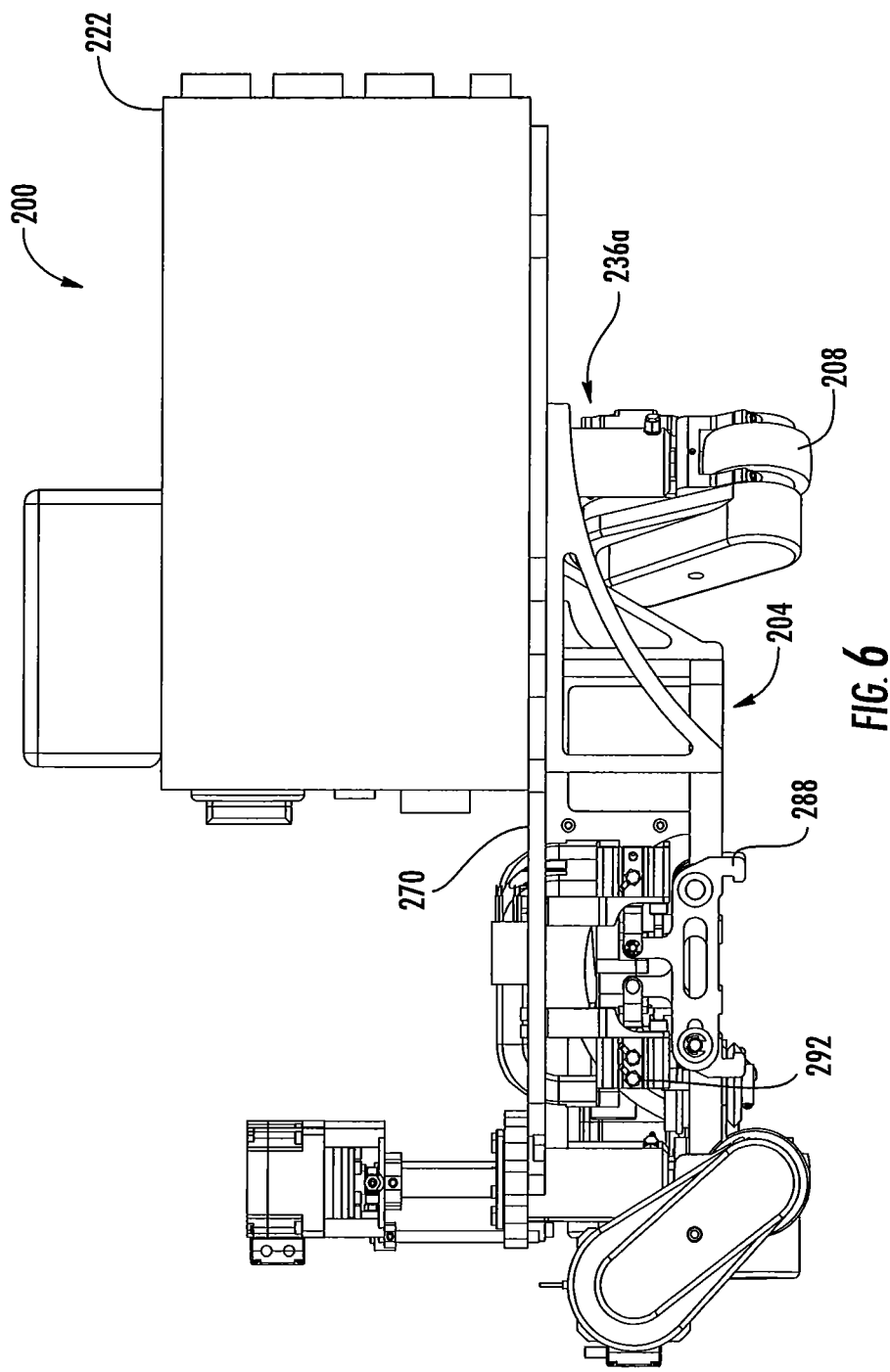
Figure 7:
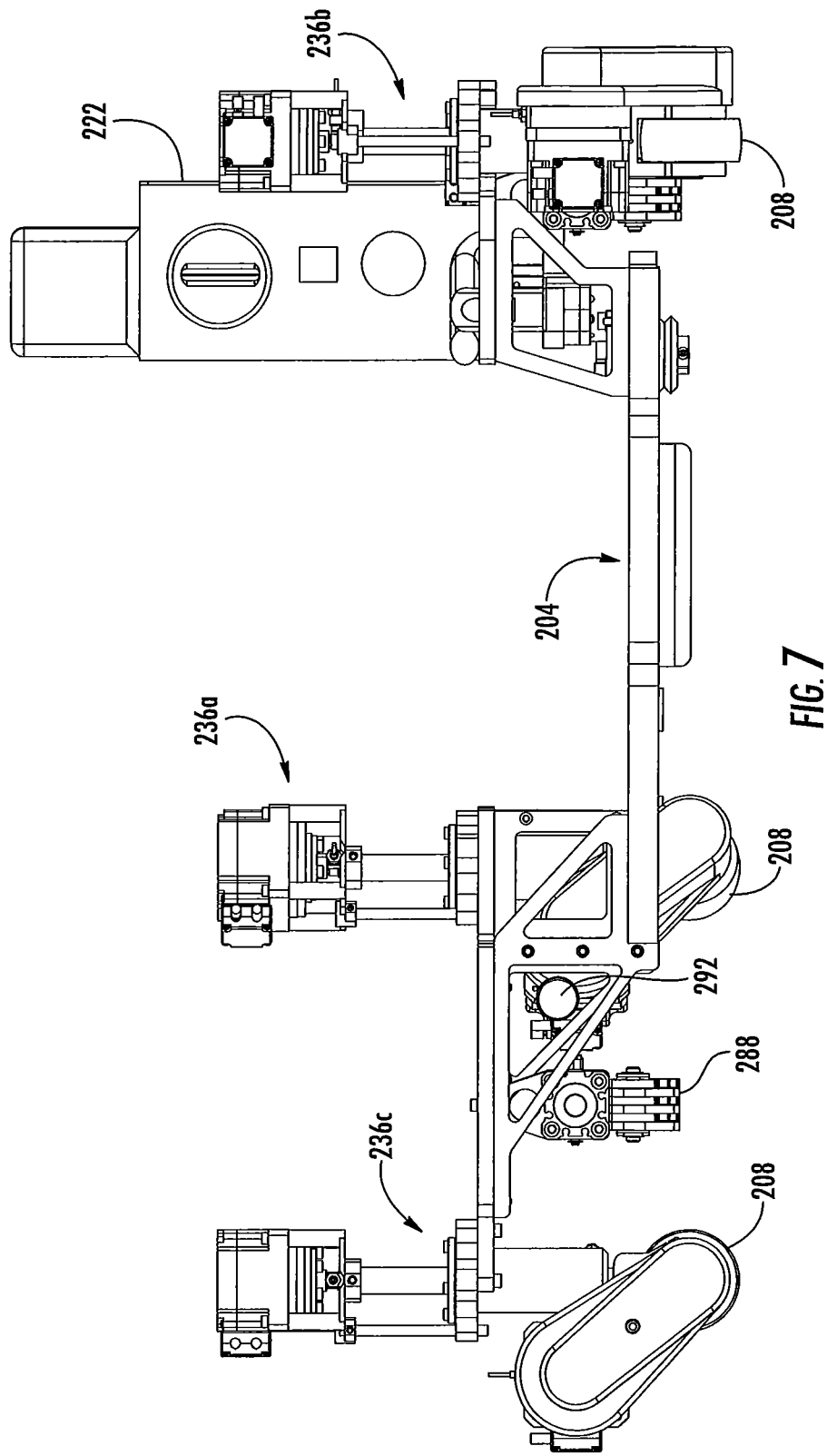
Figure 8:
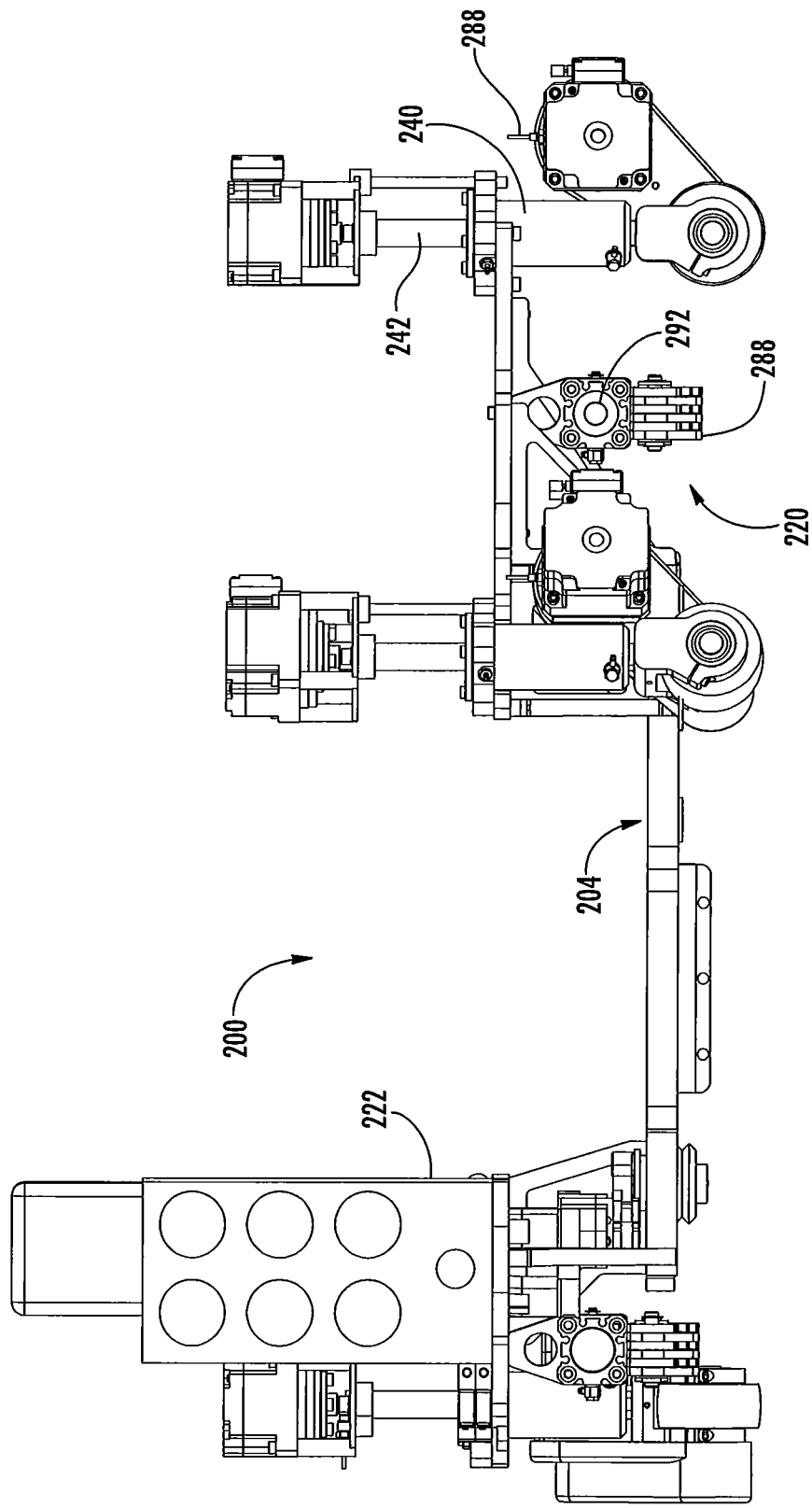
Figure 9:
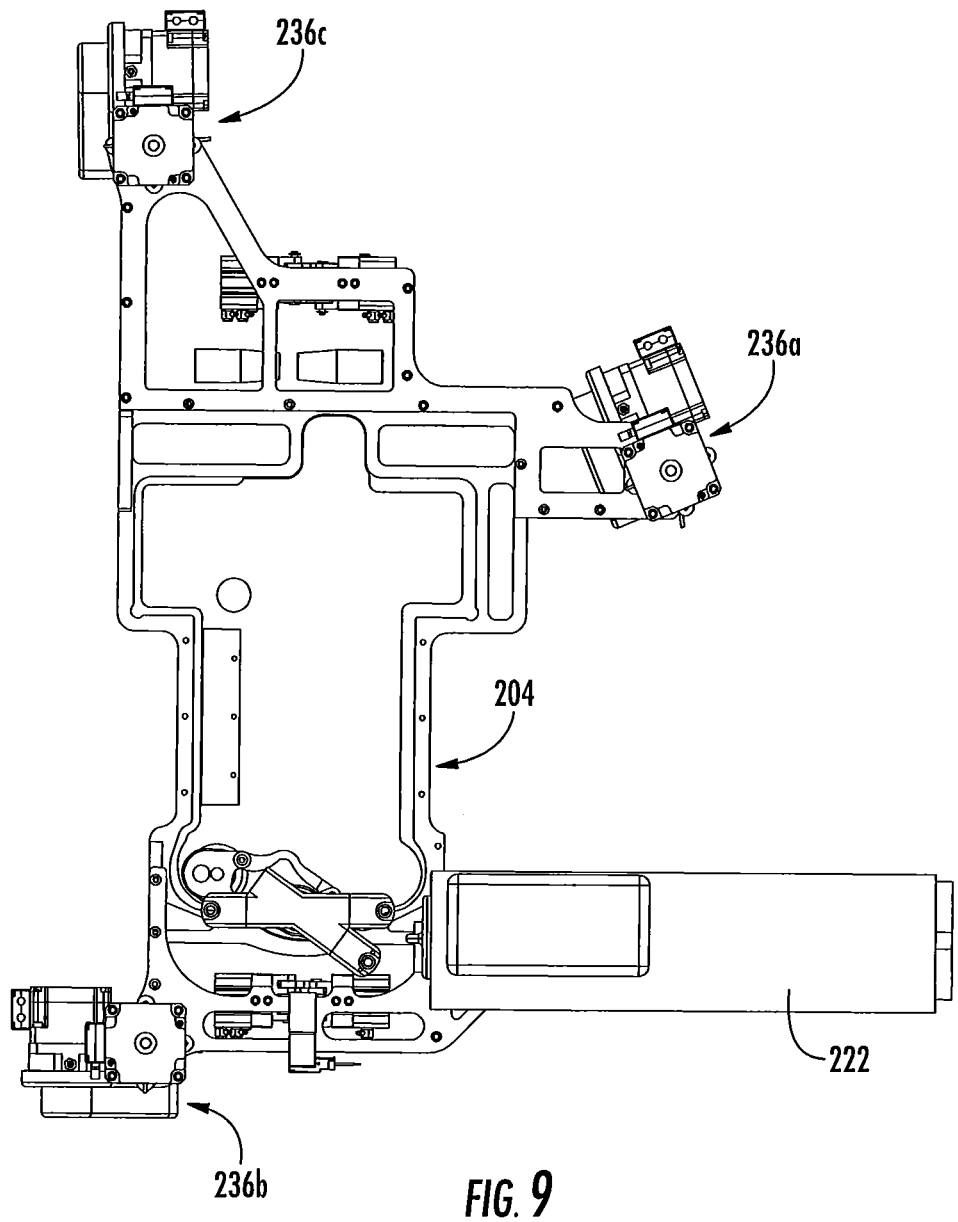
Figure 12:
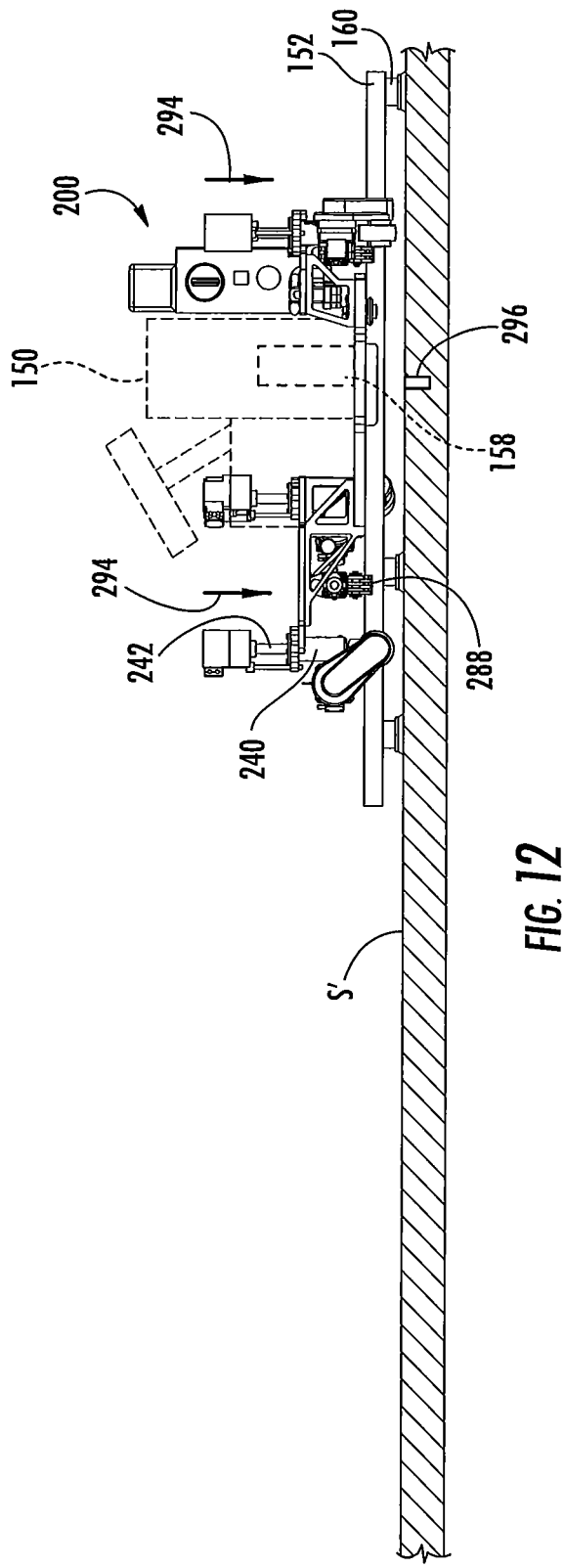
Figure 13:
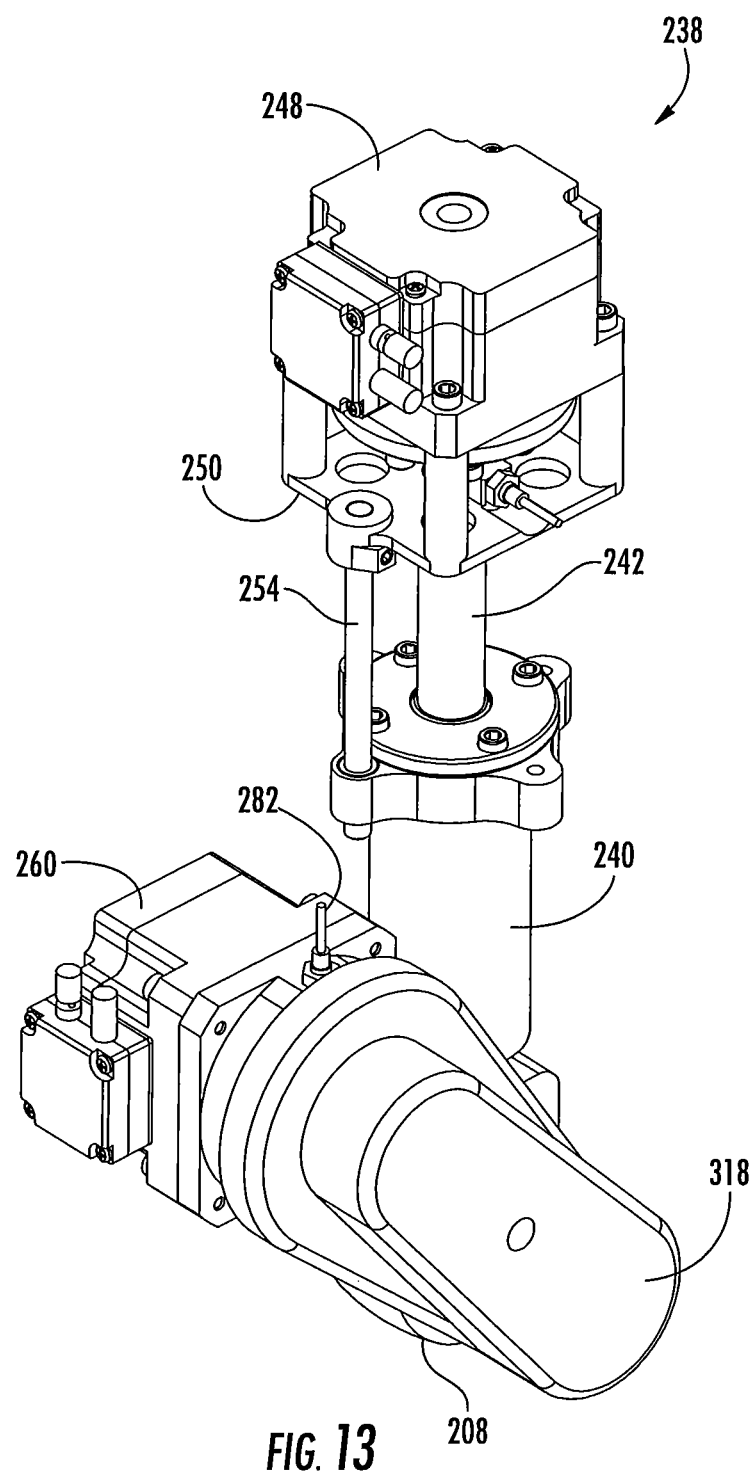
Figure 14:
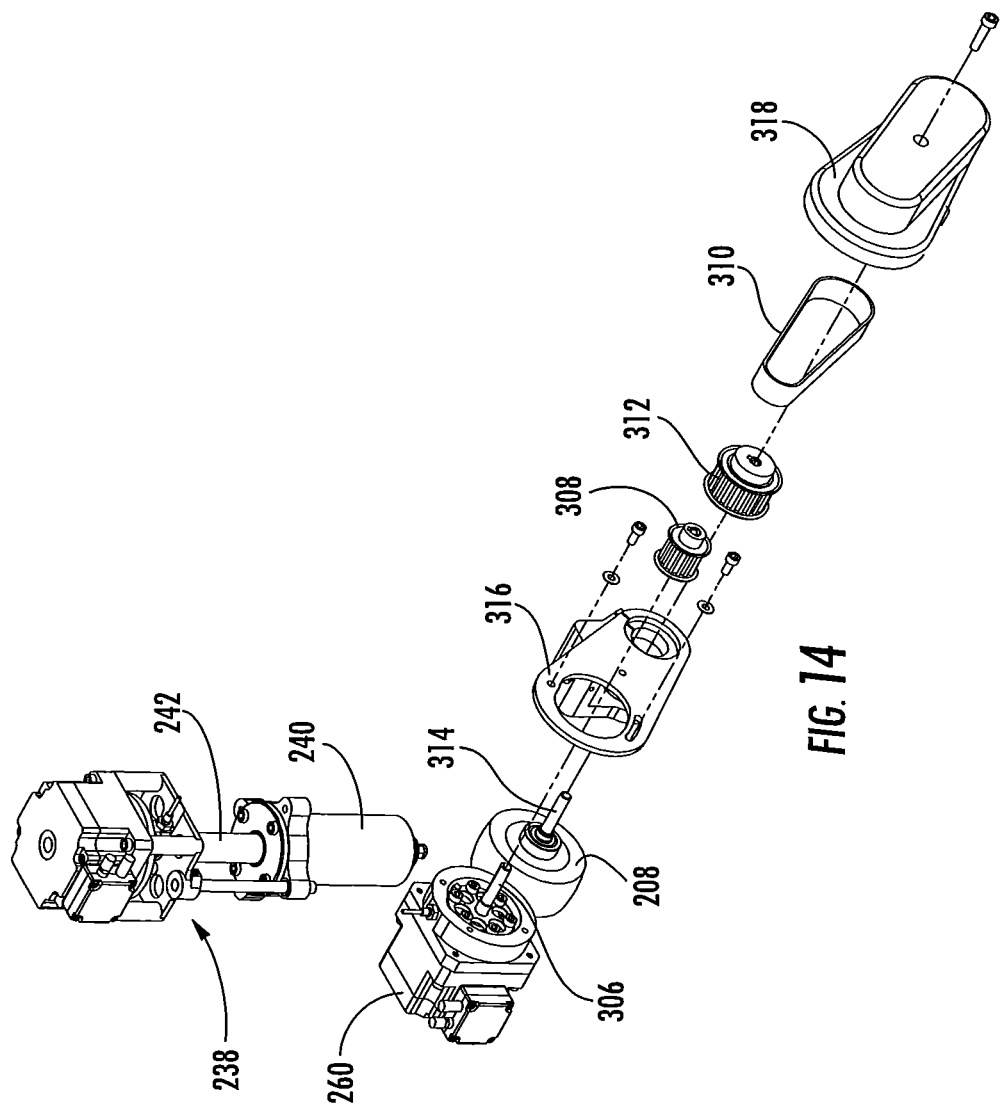
Figure 15:
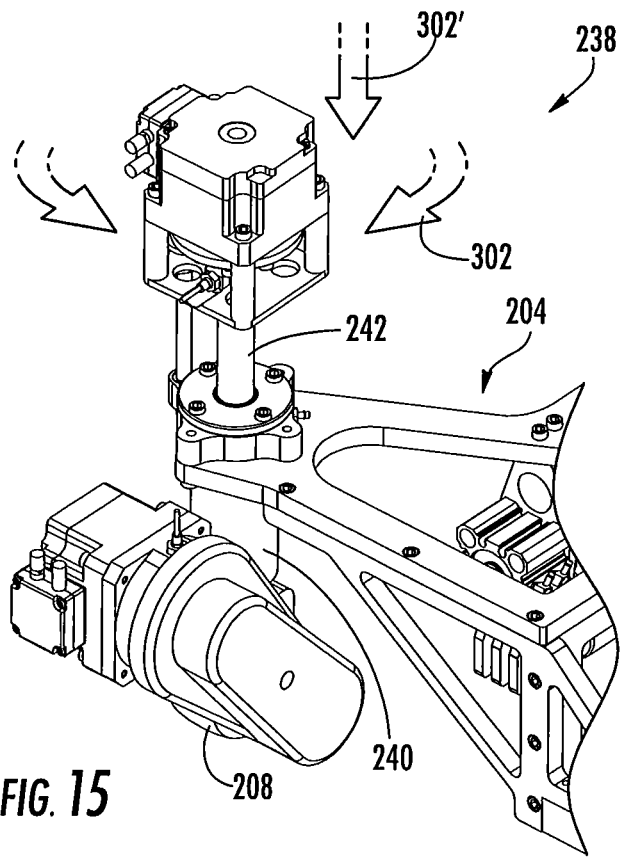
Figure 16:
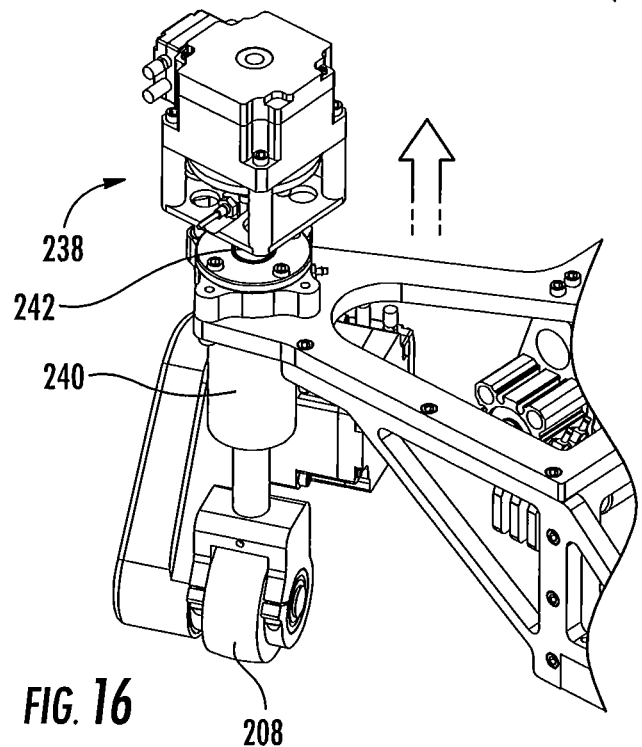
Figure 17:
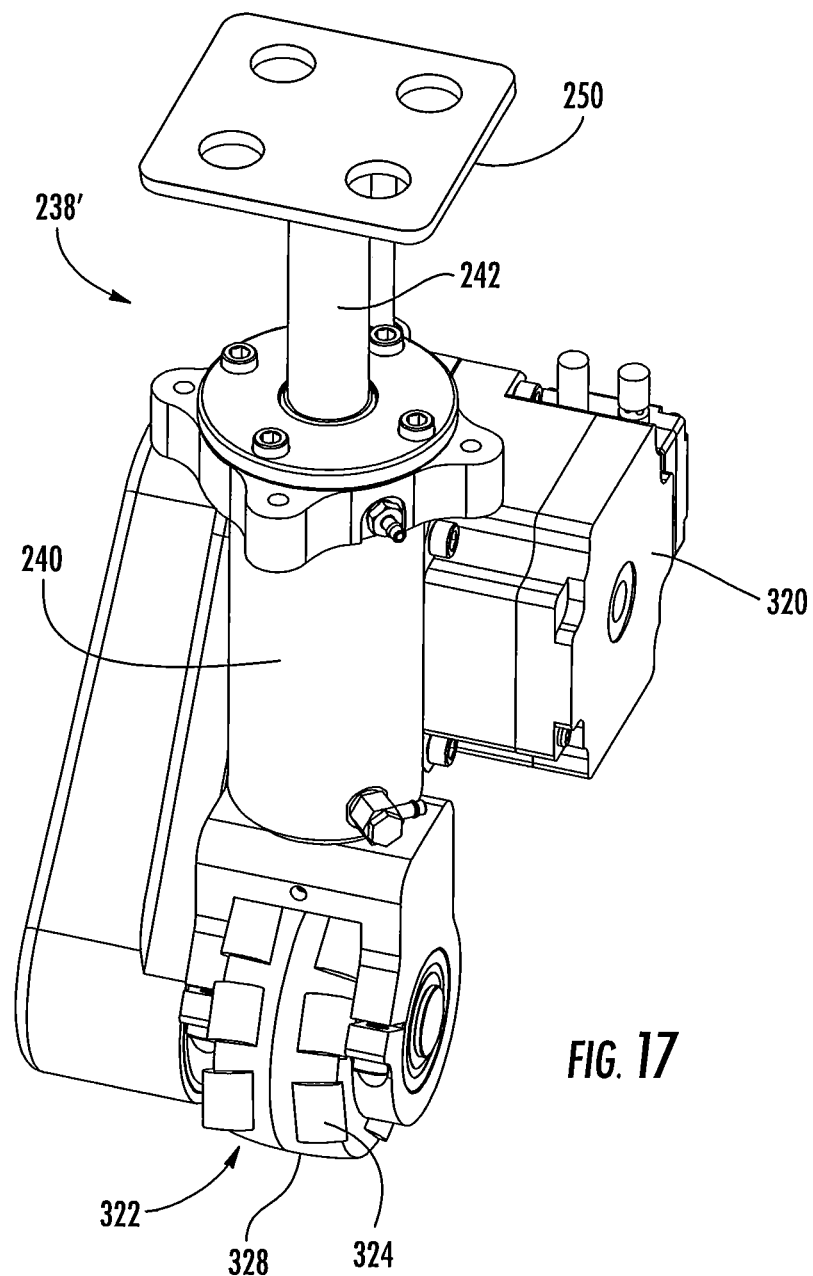
Figure 18:
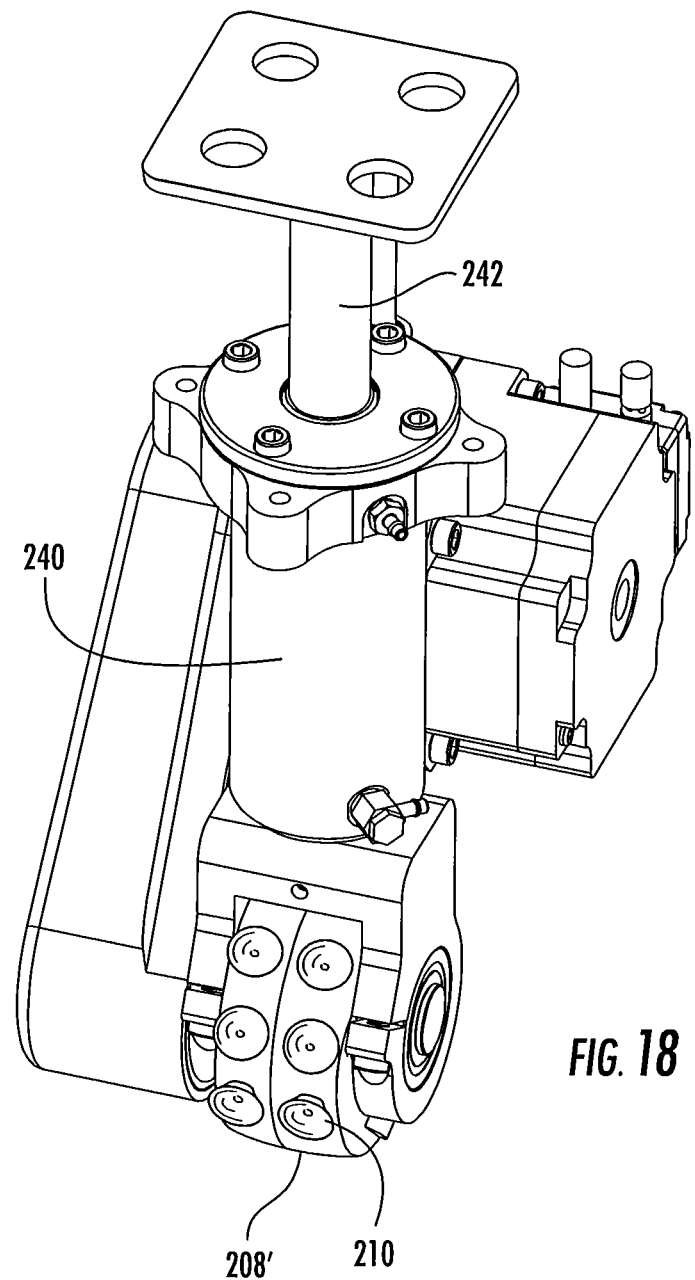

Having thus described exemplary aspects of the disclosure in general terms, reference will now be made to the accompanying drawings, which are not necessarily drawn to scale, and wherein:

FIG. 1 is a flow diagram of aircraft production and service methodology;

FIG. 2 is a block diagram of an aircraft;

FIG. 3 illustrates a processing system carried on an example apparatus for positioning the processing system and its associated track about a work surface in an automated manner;

FIG. 4 illustrates in a frontal perspective view an example apparatus for positioning a processing system;

FIG. 5 illustrates in a rearward perspective view the example apparatus for positioning a processing system shown in FIG. 4;

FIG. 6 illustrates in a left side elevational view the example apparatus for positioning a processing system shown in FIG. 4;

FIG. 7 illustrates in a frontal elevational view the example apparatus for positioning a processing system shown in FIG. 4;

FIG. 8 illustrates in a rearward elevational view the example apparatus for positioning a processing system shown in FIG. 4;

FIG. 9 illustrates in a top plan view the example apparatus for positioning a processing system shown in FIG. 4;

FIG. 10 illustrates schematically an example apparatus for positioning a processing system and its associated track relative to a work surface in an automated manner, and more specifically, illustrates such apparatus in a configuration wherein the track is attached to a surface;

FIG. 11 illustrates schematically an example apparatus for positioning a processing system and its associated track relative to a work surface in an automated manner, and more specifically, illustrates such apparatus in a configuration wherein the track is detached from a surface;

FIG. 12 illustrates schematically the example apparatus shown in FIG. 11, after having been repositioned to the right from the position shown in FIG. 11;

FIG. 13 illustrates an example wheel assembly for an apparatus for positioning a processing system and its associated track;

FIG. 14 illustrates an example wheel assembly drive system for powering one or more wheels of an apparatus for positioning a processing system and its associated track;

FIG. 15 illustrates an example lift component for an apparatus for positioning a processing system and its associated track, wherein the lift component is in a configuration for lowering such apparatus;

FIG. 16 illustrates an example lift component for an apparatus for positioning a processing system and its associate track, wherein the lift component is in a configuration for elevating such apparatus;

FIG. 17 illustrates another exemplary wheel assembly for an apparatus for positioning a processing system and its associated track relative to a surface; and FIG. 18 illustrates another exemplary wheel for a wheel assembly of an apparatus for positioning a processing system and its associated track relative to a surface.

DETAILED DESCRIPTION

Examples of the present disclosure will now be described more fully hereinafter with reference to the accompanying drawings, in which some, but not all examples of the disclosure are shown. Indeed, various exemplary aspects of the disclosure may be embodied in many different forms and should not be construed as limited to the examples set forth herein. Rather, these examples are provided so that this disclosure will be thorough and complete and will fully convey the scope of the disclosure to those skilled in the art. Like reference numerals refer to like elements throughout.

As used herein, the terms "circuits" and "circuitry" refer to physical electronic components (i.e. hardware) and any software and/or firmware ("code") which may configure the hardware, be executed by the hardware, and or otherwise be associated with the hardware. Also, as used herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. Further, as used herein, the terms "block" and "module" refer to functions than can be performed by one or more circuits. Additionally, as used herein, the term "exemplary" means serving as a non-limiting example, instance, or illustration. Moreover, as used herein, the term, for example, or "e.g.," introduces a list of one or more non-limiting examples, instances, or illustrations.

As discussed below, examples of the present disclosure include methods and apparatuses for positioning and repositioning an automated processing system, together with its associated guide and/or supporting tracks. One example includes an apparatus for carrying an automated processing system from one work area to another. At least one track, which may comprise a flexible rail, may be connected to the automated processing system and may include various configurations, including turnbuckles and/or other actuators (not shown), which configure and hold the flexible rail into conformity with the contour of a work surface (which could be flat or of a curvature) during processing by the automated processing system. The processing system may include dual function components, which could include suction-cup/pressurized-air devices that selectively attach the flexible rail to a surface and that also selectively release and/or facilitate elevation and movement of the flexible rail above and about such surface. A multi-function end effector may be associated with the flexible rail and may be moveable relative thereto.

Referring more particularly to the drawings, examples of the present disclosure may be described in the context of an aircraft manufacturing and service method, generally depicted as 100, shown schematically in FIG. 1, and an aircraft, generally depicted as 102, shown schematically in FIG. 2, with the functions of service method 100 and construction of aircraft 102 being depicted as blocks and/or modules in such figures. During pre-production, exemplary method 100 may include specification and design 104 of the aircraft 102 and material procurement 106. During production, component and subassembly manufacturing 108 and system integration 110 of the aircraft 102 takes place. Thereafter, the aircraft 102 may go through certification and delivery 112 in order to be placed in service 114. While in service by a customer, the aircraft 102 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include, without limitation, any number of aircraft manufacturers and major-system subcontractors; a third party may include without limitation any number of venders, subcontractors, and suppliers; and an operator may be an airline, leasing company, military entity, service organization, and so on.

As shown in FIG. 2, the aircraft 102 produced by exemplary method 100 may include an airframe 118 with a plurality of systems 120 and an interior 122. Examples of high-level systems 120 include one or more of a propulsion system 124, an electrical system 126, a hydraulic system 126, and an environmental system 130. Any number of other systems may be included. Although an aerospace example is shown, the principles of the invention may be applied to other industries, such as the automotive industry.

Apparatus and methods embodied herein may be employed during any one or more of the stages of the production and service method 100. For example, components or subassemblies corresponding to the production process stage 108 may be fabricated or manufactured in a manner similar to components or subassemblies produced while the aircraft 102 is in service. Also, one or more apparatus examples, method examples, or a combination thereof may be utilized during the production stages 108 and 110, for example, by substantially expediting assembly of or reducing the cost of an aircraft 102. Similarly, one or more of apparatus examples, method examples, or a combination thereof may be utilized while the aircraft 102 is in service, for example and without limitation, for maintenance and service 116.

The present disclosure is applicable in the context of manufacturing an air craft 102 and service method 100, or in other manufacturing environments, such as the automotive sector, space sector, heavy industry sector, and surface and submarine vessel maritime sector.

Referring to one example implementation of the present disclosure, FIG. 3 illustrates an apparatus, generally designated as 200, which carries an exemplary automated processing system, or "processing system," generally designated as 150, which may be used during assembly of component(s), such as during manufacturing of aircraft, during maintenance operations, servicing, etc. The processing system 150 includes an elongated track, generally designated as 152, which may comprise at least one flexible rail 154 that is readily relocatable when the need arises for processing system 150 to be moved to another work area. Given the finite length of track 152, the effective working area of processing system 150 may be limited by the length and/or location of track 152 with respect to a work surface. Accordingly, upon completion of the processing in a particular working area, track 152 and processing system 150 are removed from one location and repositioned at another location if additional processing is desired. Processing system 150 includes an operational portion, such as an end effector 158 in FIGS. 10-12, that may move transversely and/or longitudinally with respect to track 152. The processing system 150 performs processing (e.g., drilling) operations on a work surface S' (see, e.g., FIG. 12) and may include use of one or more manually operated, automated, and/or robotic end effectors 158.

Processing system 150 could be of a variety of configurations and may be a portable, automated motorized device which may be operable to process a physical target, such as an assembly or component. Processing system 150 may be used in performing particular operations (e.g., a drilling, bolting, and/or fastening) in a controlled manner. For example, processing system 150 may be used during manufacturing and/or assembly of aircraft or components thereof (e.g., fuselage or wings). In this regard, processing system 150 may preferably be associated with a work surface S' (FIG. 10) of a structure S, which could be flat or contoured, such as an aircraft wing (or some other surface or structure) and may then be moved to various locations along the work surface for performing manufacturing operations (e.g., formation of holes) thereon. Movement of processing system 150 along track 152 may be facilitated by engagement of a powered pinion gear (not shown) of processing system 150 with a rack profile 166, of track 152 (FIG. 3). Control pendant 168 may be used to control processing system 150 and/or apparatus 200 by an operator. A pressurized air supply (not shown) may be connected to inlet 170 (FIG. 3) for supplying pressurized air to operate dual-function components 160 and/or vacuum generators (not shown) and cylinders 240 and 292 (FIG. 8) (discussed below).

Dual-function components 160 (FIG. 3) may be configured to provide multiple functions related to support and movement of the processing system 150. The dual-function components 160 may be configured to provide, for example, an adhering or a holding function (e.g., relating to securing the track 152 and the processing system 150 to the structure being processed), and a gliding or a hovering function (e.g., relating to moving the track 152 and the processing system 150 relative to the supporting surface thereof). For example, the dual function component 160 may comprise a suction-cup/air-bearing assembly that may be configured to provide a securing function of processing system 150 with respect to surface S' by use of vacuum created via the suction cup; and to provide the 'gliding' or 'hovering' function of the track 152 and the processing system 150 by use of air bearing. This ability of track 152 and processing system 150 to hover or glide over a surface may facilitate fine adjustment in the positioning of processing system 150 with respect to apparatus 200, if desired.

Turning now to FIG. 4, an example implementation of apparatus 200 is shown isolated from processing system 150 (FIG. 3). Although discussed more fully below, apparatus 200 may include a chassis, generally designated as 204, that selectively carries processing system 150 (FIG. 3) and track 152. At least three wheels 208 (see, e.g., FIG. 7) are connected to the chassis 204. Wheels 208 selectively support the chassis 204 on the surface S' (FIGS. 10-12) and selectively permit movement of the chassis about the surface. A drive component, generally designated as 212, is operably connected to one of the wheels and selectively propels the wheel to move the chassis about the surface S'. Additional drive component or components may power one or more of the remaining wheels 208. Lift components, generally designated as 216, selectively move the chassis between a lowered position, generally proximate the surface S' (as shown in FIG. 10), and an elevated position, generally spaced away from the surface S' (as shown in FIG. 11). At least one track-engaging, or gripping, component, generally designated as 220, may be connected to the chassis 204 or may form a part thereof. The gripping component 220 may be selectively configured in a first state or a second state. In the first state (position), the gripping component 220 is engaged with the track 152 (FIG. 3) and in a second state (position), the gripping component 220 is disengaged from the track. Gripping component 220 engages the track 152 when the processing system 150 is being moved by the chassis 204 and is disengaged from the track 152 when the track 152 is coupled to the surface and the processing system 150 is in operation. A controller or controllers 222, may be operatively connected to drive component or components 212, lift components 216, and gripping component or components 220. The controller 222 is configured to selectively direct gripping component or components 220 to engage the track 152 (FIG. 3), to selectively direct the lift components 216 to move the chassis 204 between the lowered position and the elevated position, and to actuate drive component or components 212 to propel one or more wheels 208 for moving the chassis 204, together with processing system 150 and track 152, relative to the surface S' to a predetermined position. Processing system 150 will be discussed in more detail below.

Also as shown in FIG. 4, one example apparatus 200 includes the chassis 204, which has a framework with spaced-apart side portions, generally designated as 224 and 226, and spaced-apart end portions, generally designated as 230 and 232. In the example illustrated in FIG. 4, chassis 204 has three corner portions, generally, 236*a*, 236*b*, and 236*c*. One wheel assembly 238 is positioned at each of the corner portions 236*a*, 236*b*, and 236*c*. Although apparatus 200 is shown having three wheel assemblies, it is to be understood that apparatus 200 could be provided with four or more wheel assemblies, if desired.

Wheel assemblies 238 are shown in detail in FIGS. 13-16. Generally, wheel assemblies 238 are each provided with at least one wheel 208 and a cylinder 240, having an actuatable shaft 242. Shaft 242 is connected to a wheel-steering motor 248, which is mounted to a plate 250. Plate 250 is fixed against rotation with respect to chassis 204 (FIG. 4) via a post 254, which couples plate 250 and chassis 204. Cylinder 240 may be pneumatic or hydraulic and may function as one of the lifting components 216 (FIG. 4), which selectively lift and lower chassis 204 with respect to surface S'. Controller 222 (FIG. 4) may be used to control and actuate cylinders 240 and/or they may be controlled manually and/or remotely.

Referring once again to FIGS. 13-16, steering motor 248 rotates the wheel 208 of wheel assembly 238 about the longitudinal axis of shaft 242 of cylinder 240. At least one wheel assembly 238 may include steering motor 248. Wheel steering motor 248 communicates via a wired and/or wireless connection with controller 222 and/or potentially with a pendant or remote control 168 (FIG. 3) of processing system 150, thereby allowing the steering action of wheel steering motor 248 to be controlled using steering protocol software and/or firmware, or code, of controller 222 and/or such remote control. The wheel-steering motor control could also be performed manually, if desired. It is to be noted that the steering of each wheel assembly 238 can operate independently of one another and thus afford chassis 204 a variety of movements and motions with respect to surface S'. At least one wheel assembly 238 also includes a wheel drive motor 260 (FIG. 13) for driving the wheel 208 of each wheel assembly 238. Wheel steering motor 248 and wheel drive motor 260 can each be servo motors, stepping motors, DC motors, or other suitable drive devices.

In an example where each wheel assembly 238 has its own wheel steering motor 248 and wheel drive motor 260, due to the independent controllability of each wheel assembly 238 by controller 222 or otherwise, movement of chassis 204 relative to surface S' may be described by rotational motions (wherein chassis 204 can rotate essentially within its own footprint and/or about its own center of rotation), rectilinear motions, curvilinear motions, and/or vector, or, translational motions, wherein chassis 204 may maintain a predetermined orientation relative to a fixed point as it moves from one position to another position on surface S'.

At least one controller 222 is, carried on-board chassis 204, and, as shown in FIG. 4, controller 222 may be attached to a flange 270 of chassis 204. It is to be understood that the controller may have different sizes and configurations and is not limited to the examples depicted herein. An exemplary controller 222 may include control circuits, circuitry, amplifiers, one or more processors, software and/or firmware, or code, electronic memory, power supplies, transformers, and the like, and may be connected to and used for operation of wheels during motors 248, wheel drive motors 260, cylinders 240, and cylinders 292 (discussed below) (FIGS. 5 and 6). Controller 222 may include displays and/or manual controls, generally 280, as shown in FIG. 4 and could include use of a motion controller such as sold by Galil Motion Control, of 270 Technology Way, Rocklin, Calif. 95765.

One or more proximity sensors 282 (FIG. 4) may be provided in connection with one or more wheel assemblies 238 (FIG. 13) for assisting in determining the precise location of chassis 204 (FIG. 10) about surface S' at a given time. Proximity sensors 282 (FIG. 4) may be connected to and communicate with controller 222 for this purpose and/or may be connected to a remote controller and/or a manual control, such as pendant 168.

As shown in FIGS. 5 through 9, one or more gripping components, generally 220, are associated with chassis 204. Gripping components may each include jaws 288 (FIG. 5), which may be configured in either a first position (state) for engaging track 152 (FIG. 11) or a second position (state), disengaged from track 152 (FIG. 12). When jaws 288 engage track 152, the movement of the processing system 150 relative to track 152 may, in one example, be prevented. However, it is to be understood that, according to other aspects of the disclosure, relative movement between processing system 150 and track 152 (e.g., in a direction transverse to the track 152) may be permitted even if track 152 is engaged by gripping components 220. Gripping components 220 each include a pneumatic or hydraulic cylinder 292 (FIGS. 5 and 6), connected to jaws 288. The cylinders activate jaws 288 to move them between the track-engaging and track-disengaging positions. Cylinders 292 may be in communication with and activated by controller 222 and/or a remote controller and/or may be manually controlled. Alternatively, gripping component 220 may include a locking pin or pins (not shown), selectively engaging a corresponding opening or openings (not shown) formed in track 152. In yet another example of gripping component 220, the pinion gear (not shown) of processing system 150 that engages the rack profile 166 of the elongated track 152 (FIG. 3) may include a locking feature (not shown) to selectively prevent translation of the processing system 150 relative to the track 152.

As shown in FIGS. 10-12, apparatus 200 allows processing system 150 to be readily repositioned from a first location (FIG. 10) to second location (FIG. 12) in an automated manner. Referring to FIG. 10, apparatus 200 is at the first location and is in a first, lowered position, generally proximate surface S'. In this position, wheels 208 are retracted (since shafts 242 are in their uppermost orientations relative to their respective cylinders 240 and wheels 208 are connected to and move with shafts 242 of cylinders 208) and are substantially disengaged from surface S'. In preparation for transporting the processing system 150 to a second location, jaws 288 are configured in a first state for engaging track 152 upon actuation of the cylinder 292 by controller 222. In the event dual function components 160 (which could include combination suction-cup/pressurized air devices) have been configured to attach track 152 to surface S', components 160 may be deactivated (such as by reducing or eliminating the vacuum actuation thereof) to release track 152 from surface S' prior to repositioning moving apparatus 200, track 152, and processing system 150.

As shown in FIG. 11, apparatus 200 is to be moved from the first location in the direction of arrow 293. Once track 152 is securely engaged by jaws 288, cylinders 240 are actuated to lift chassis 204 from the first, lowered position, to a second, elevated position, which, at the same time, also lifts processing system and track 152 in the direction of arrows 295. In other words, as shafts 242 of cylinders 240 move toward surface S', wheels 208 are advanced, or extended, toward and are biased against surface S', lifting chassis 204 in the direction of arrows 295. Accordingly, the chassis may now be movably supported on surface S' by wheels 208 so that processing system 150 and track 152, carried by chassis 204, may be moved in virtually any direction about desired portions of surface S'. Movement of apparatus 200 may be manually directed by remote control or may be automatically controlled via a pre-programmed steering and drive protocol of controller 222 (whereby controller 222 may activate wheel drive motors 260 and wheel steering motors 248 to propel and steer chassis 204 to a predetermined location on surface S'). As chassis 204 is moved to the second location, the motion of the chassis could be rotational motion, curvilinear motion, rectilinear motion and/or a combination of the foregoing. While jaws 288 securely engage track 152, processing system 150 is generally restrained, or prevented, from movement with respect to track 152 and chassis 204.

Once chassis 204 is proximate the second location on surface S', as shown, for example, in FIG. 12, the position of chassis 204 may be adjusted more accurately by detecting one or more locator, or pilot, holes 296, strategically situated along surface S' (FIGS. 10 and 12). Processing system 150 may include a pilot-hole detector (not shown), which may be connected to controller 222 and/or another controller of processor system 150. A suitable pilot hole detector could use electronic, optical, sound and/or mechanical modes for detecting pilot holes and could, in one embodiment, include an electronic sensor and/or mechanical feeler probe to facilitate accurate positioning of system 150 for processing at a predetermined location.

Once chassis 204 is properly positioned, such as at a second location shown in FIG. 12, cylinders 240 are again actuated, such that the shafts 242 extend upwardly therefrom, thereby placing chassis 204 in the lowered position in the direction of arrows 294 (via controller 222 actuating cylinders 240, such that the shafts 242 thereof move upwardly in their respective cylinders). Accordingly, track 152 (which has been transported by chassis 204, along with processor system 150 to the second location) is lowered sufficiently to deposit track 152 on surface S'. Once track 152 is lowered, dual-function components 160 are in position to engage surface S'. At this juncture, components 160 may be activated for coupling track 152 to surface S' via vacuum attachment or otherwise. Once track 152 has been securely attached to surface S', jaws 288 may be activated to disengage track 152, so that chassis 204 and processing system 150 are free to move relative to track 152 to perform processing functions on or about surface S'.

To assist in the precise positioning of chassis 204 at the predetermined (e.g., second) location on surface S', chassis 204 may additionally be provided with a chassis location transmitter and/or a chassis location receiver (or a combination chassis location transceiver) 298 (FIG. 10), for transmitting location signals and/or information to and receiving signals and/or information from a location reference transmitter and/or a location reference receiver (or a combination location reference transceiver) 300. Location reference transceiver 300 may be a global positioning satellite (GPS) device, and/or may be a localized device that provides location reference information, such as a localized metrology system.

It is to be understood that instead of dual function components 160, other releasable attachment devices could be used to releasably attach track 152 to surface S', such as clamps, magnetic devices, threaded fasteners, straps, cables, or other devices.

FIG. 14 illustrates an example wheel assembly 238 in a partially exploded view. Wheel driving motor 260, which may be reversible, is illustrated with an output shaft 306 to which a motor pulley 308 is attached. A belt 310 is connected to a wheel pulley 312, which is coupled to a shaft 314 of wheel 208 for driving wheel 208. A bracket 316 is positioned around pulleys 308 and 312, and a shield 318, attached to bracket 316, covers the assembly.

FIG. 15 illustrates a wheel assembly 238, whose motion has two degrees of freedom. Wheel assembly 238 allows wheel 208 to be rotated 360° about a vertical axis in either direction, as shown by arrows 302, and may also permit wheel 208 to move up or down, as shown by arrow 302', with respect to chassis 204. FIG. 15 illustrates shaft 242 in an upwardly extended position relative to cylinder 240. When shaft 242 of each cylinder 240 is in this configuration, chassis 204 is in a lowered position, and the majority of shaft 242 may extend above cylinder 240.

FIG. 16 illustrates chassis 204 in an elevated position, wherein shaft 242 of each cylinder 240 has been caused to extend downwardly relative to cylinder 240. Cylinders 240 (and cylinders 292) can be double-acting cylinders, or could be single-acting with a spring return, if desired. Alternately, other elevation devices could be used instead of or in addition to cylinders 240, such as screw jacks (none shown) if desired.

FIG. 17 shows another exemplary wheel assembly, designated generally as 238'. Wheel assembly 238' may require only one motor 320, which may be a differential motor connected to for driving a polywheel, or omni wheel 322, which includes a series of rollers 324 circumferentially disposed within one or more circular carriers 328. Omni wheels 322 could include, in one implementation, use of Mecanum wheels, such as model (am-0137), available from AndyMark, Inc., of 2311 N. Washington St., Kokomo, Ind. 46901. Omni wheels 322 and motor 320 may be actuated and controlled by an omni wheel actuator, which could be controller 222 and/or remote control and/or manually, if desired, and allows chassis 204 to move along surface S' in a variety of directions in the X-Y plane, to rotate about itself, to move in a vector, or translational, motion, in addition to rectilinear and curvilinear motions, and/or combinations of the foregoing motions, in order to move chassis 204 to a predetermined position.

In another example, as shown in FIG. 18, wheels 208' may include suction cups 210 that attach wheels 208' to surface S'. Suction cups 210 could be passive or active, i.e., wherein a powered vacuum is drawn through suction cups 210.

It is to be noted that while chassis 204 has been illustrated as being separate or separable from processing system 150, it could be made integral with processing system 150 if desired.

In an example implementation, apparatus 200 and processing system 150 may share controller 222 or could each have one or more of their own controllers. In one example, the controller of apparatus 200 may communicate with the controller of processing system 150 or could operate independently therefrom. A controller component (not shown) may be provided for controlling various operations and/or components of the processing system 150. In this regard, the controller component may comprise a circuit and/or programmable circuitry providing control signals to at least some of the components of the apparatus 200 and/or processing system 150 to enable configuring these components to perform various operations.

Apparatus 200 and/or processing system 150 may be configured to receive and/or transmit information, such as by incorporating a communication component for providing and/or handling communications to, from, and/or between one another. In this regard, apparatus 200 and/or processing system 150 may receive, for example, user input, which may be used in controlling and/or adjusting various operations or functions of the apparatus 200 and/or processing system 150. The user input may comprise, for example, movement related commands, such as "start," "stop," "raise," "lower," "grip," "release," "forward," "reverse," "turn left," "turn right," and/or other similar commands. The communication component may also be configured to enable transmitting status information, such as information relating to various components or functions of apparatus 200 and/or processing system 150. The status information may be transmitted to other devices that may be utilized by users (e.g., a computer). The reception and/or transmission may be performed wirelessly, using one or more appropriate technologies. For example, communications may be via infra-red (IR) signals, near-field communication (NFC) signals, Bluetooth signals, and/or WiFi signals. This disclosure is not limited, however, to any particular communication technology.

Although only one apparatus 200 is shown in the drawings as being attached to automated processing system 150, it is to be understood that multiple apparatuses 200 could be connected to one or more processing system 150 in varying configurations and orientations with respect to one another, if desired.

Many modifications and other exemplary aspects of the disclosure set forth herein will come to mind to one skilled in the art to which this disclosure pertains, having the benefit of the teachings presented in the foregoing descriptions and the associated drawings. Therefore, it is to be understood that the disclosure is not to be limited to the specific examples disclosed and that modifications and other exemplary aspects of the disclosure are intended to be included within the scope of the appended claims. Moreover, although the foregoing descriptions and the associated drawings illustrate examples in the context of certain example combinations of elements and/or functions, it should be appreciated that different combinations of elements and/or functions may be provided by alternative examples without departing from the scope of the appended claims. For instance, different combinations of elements and/or functions than those explicitly described above are also contemplated as may be set forth in the appended claims. Although specific terms are employed herein, they are used in a generic and descriptive sense only and not for purposes of limitation.

What is claimed is:

1. An apparatus for positioning an automated processing system, the automated processing system having a track engageable with a surface, the apparatus comprising:
a chassis that selectively carries the automated processing system and the track;
at least three wheels, connected to the chassis and adapted to movably engage the surface, that selectively support the chassis on the surface and selectively permit movement of the chassis about the surface;
a drive component operably connected to the wheels that selectively propels the wheels to move the chassis about the surface;
an extensible lift component, connected to the at least three wheels and the chassis, that selectively moves the chassis between a lowered position, generally proximate the surface, and a raised position, generally spaced away from the surface, wherein the raised position is further from the surface than the lowered position; and
a gripping component connected to the chassis that selectively moves with respect to the track between a first position engaging the track and a second position substantially disengaged from the track.

2. The apparatus of claim 1, further comprising:
at least one controller operably connected to the drive component, the lift component, and the gripping component, wherein the at least one controller selectively actuates:
the gripping component to move from the first position to the second position to engage the track;
the lift component to move the chassis from the lowered position to the raised position; and
the drive component to propel the wheels to move the chassis together with the automated processing system and the track about the surface to a predetermined position.

3. The apparatus of claim 1, further comprising:
at least one controller operably connected to the drive component;
the drive component including:
a first motor that propels the wheels; and
a second motor that steers the wheels; and
the controller being configured to selectively propel and direct the chassis to a predetermined position by actuating the first motor and the second motor.

4. The apparatus of claim 1, further comprising:
at least one controller operably connected to the drive component;
the drive component including a motor that both propels and steers the chassis as the chassis moves about the surface; and
the controller being configured to selectively propel and direct the chassis via translational motion to a predetermined position by actuating the motor.

5. The apparatus of claim 1, wherein:
the wheels are omni wheels including rollers and generally circular carriers, wherein at least one roller is circumferentially coupled to one or more of the circular carriers;
at least one controller is operably connected to the drive component; and
the drive component further includes a motor connected to one or more of the omni wheels, wherein the motor drives the omni wheels in a manner to both propel and direct the chassis as the chassis moves about the surface.

6. The apparatus of claim 1, further comprising:
the wheels being omni wheels including rollers and generally circular carriers, wherein at least one roller is circumferentially coupled to one or more of the circular carriers;
at least one controller operably connected to the drive component;
the drive component including a differential motor connected to one or more of the omni wheels that drives the omni wheels in a manner to both propel and direct the chassis as the chassis moves about the surface; and
the controller being configured to selectively propel and direct the chassis via a translational motion to a predetermined position by actuating the differential motor.

7. The apparatus of claim 1, wherein:
the gripping component, upon being in the first position, substantially fixes the chassis against movement with respect to the track; and
the gripping component, upon being in the second position, permits movement of the chassis with respect to the track.

8. The apparatus of claim 1, wherein:
upon the chassis being in the lowered position, the wheels substantially engage the surface; and
upon the chassis being in the raised position, the wheels are substantially disengaged from the surface.

9. The apparatus of claim 1, further comprising:
the wheels including suction cups that attach the wheels to the surface.

10. The apparatus of claim 2, further comprising:
a location transceiver connected to the at least one controller, wherein the location transceiver receives and transmits information regarding a location of the chassis; and
a reference transceiver that receives information from the location transceiver regarding the location of the chassis and that transmits to the location transceiver a reference information.

11. The apparatus of claim 2, further comprising:
a location transceiver connected to the at least one controller, wherein the location transceiver receives and transmits information regarding a location of the chassis; and
a global positioning satellite transceiver that receives information from the location transceiver regarding the location of the chassis and that transmits to the location transceiver a reference information.

12. An automated processing system that moves about a surface, the automated processing system being operable to perform processing operations and comprising:
at least one track;
an end effector associated with the track and moveable relative thereto that selectively processes the surface;
an actuator that selectively moves the end effector with respect to the track;
a chassis that selectively supports the end effector and the track;
at least three wheels connected to the chassis and adapted to movably engage the surface that supports the chassis on the surface and that selectively permit movement of the chassis about the surface;
a drive component operably connected to the wheels that selectively propels the wheels to move the chassis about the surface;
an extensible lift component, connected to the at least three wheels and the chassis, that selectively moves the chassis between a lowered position, generally proximate the surface, and a raised position, generally spaced away from the surface, wherein the raised position is further from the surface than the lowered position;
a gripping component connected to the chassis that selectively moves between a first position engaging the track and a second position disengaged from the track; and
at least one controller operably connected to the drive component, the lift component, and the gripping component that selectively actuates:
the gripping component to move from the first position to the second position to engage the track;
the lift component to move the chassis from the first lowered position to the raised position; and
the drive component to propel the wheels to move the chassis together with the end effector and the track about the surface to a predetermined location.

13. An apparatus for positioning a device that travels along a track, the track being engageable with a surface, the apparatus comprising:
a chassis that selectively carries the device and the track;
at least three wheel assemblies connected to the chassis and adapted to movably engage the surface, wherein the at least three wheel assemblies selectively support the chassis on the surface and selectively permit movement of the chassis about the surface, each of the three wheel assemblies including:
a first motor operably connected to the wheels that selectively propels the wheels to move the chassis about the surface;
a second motor that steers the chassis as the chassis moves about the surface; and
an extensible lift component, connected to the at least three wheels and the chassis, that selectively moves the chassis between a lowered position, generally proximate the surface, and a raised position, generally spaced away from the surface, wherein the raised position is further from the surface than the lowered position;
a gripping component connected to the chassis, wherein the gripping component selectively moves between a first position engaging the track and a second position disengaged from the track; and
at least one controller operably connected to the first motor of each of the three wheels, the second motor of each of the three wheels, the lift component, and the gripping component, wherein the at least one controller selectively actuates:
the gripping component to move from the first position to the second position;
the lift component to move the chassis from the lowered position to the raised position; and
the first motor and the second motor to propel and steer each of the three wheels to move the chassis together with the device and the track about the surface to a predetermined location.

14. A method of positioning an automated system that travels along a track, the track being attachable to a surface, the method comprising:
providing a chassis configured to carry the automated system and the track, the chassis having wheels that selectively support the chassis on the surface and permit movement of the chassis about the surface;
detaching the track from the surface;
engaging the track with a gripping component connected to the chassis for moving the track with the chassis;
lifting the chassis and the gripping component and track therewith from the surface with an extensible lift component, the lift component being connected to the wheels and the chassis; and
propelling the wheels with a drive component to move the chassis together with the automated processing system and the track about the surface to a predetermined location.

15. The method of claim 14, further comprising:
prior to the step of detaching the track from the surface:
disengaging the gripping component to deposit the track at a first position on the surface; and
releasably attaching the track at the first position on the surface.

16. The method of claim 14, further comprising:
providing a track attachment device that releasably attaches the track to the surface; and
prior to the step of detaching the track from the surface:
disengaging the gripping component to deposit the track at a first position on the surface; and
releasably attaching the track at the first position on the surface using the track attachment device.

17. The method of claim 14, wherein:
the step of propelling the wheels further includes selectively steering the wheels to position the chassis at the predetermined position.

18. The method of claim 14, wherein
the step of providing the chassis having wheels further includes providing omni wheels including rollers and generally circular carriers, wherein at least one roller is circumferentially coupled to one or more of the circular carriers and an omni wheel actuator for actuating the omni wheels; and
the step of propelling the wheels further includes selectively actuating the omni wheels with the omni wheel actuator to cause the chassis to move via translational motion to the predetermined position.

19. The method of claim 14, wherein:
the step of engaging the track with the gripping component further includes:
substantially fixing the chassis against movement with respect to the track; and
disengaging the track from the gripping component to permit movement of the chassis with respect to the track upon the chassis being at the predetermined location.

20. The method of claim 14, further comprising:
prior to the step of propelling the wheels with a drive component, advancing the wheels to the surface; and
upon the chassis being at the predetermined location on the surface, substantially retracting the wheels such that the wheels substantially disengage from the surface.

21. The method of claim 14, further comprising:
providing a chassis location transmitter associated with the chassis and a chassis location receiver;
transmitting information to a location reference regarding the position of the chassis using the chassis location transmitter;
receiving the location reference information regarding the position of the chassis from the location reference using the chassis location receiver; and
verifying whether the chassis is at the predetermined location on the surface using the location reference information.

22. The method of claim 14, further comprising:
providing a location reference;
providing a location reference receiver for receiving information from the chassis location transmitter and a location reference transmitter for transmitting to the chassis location transmitter location reference information;
receiving chassis location information from the chassis location transmitter using the location reference receiver;
transmitting location reference information to the chassis location receiver using the location reference transmitter; and
verifying whether the chassis is at the predetermined location on the surface using the location reference information transmitted by the location reference transmitter.

23. An apparatus for positioning a device that travels along a track, the track being engageable with a surface, the apparatus comprising:
a chassis that selectively carries the device and the track;
at least three wheels connected to the chassis that selectively support the chassis on the surface and selectively permit movement of the chassis about the surface, the at least three wheels being configured to be steerable and being adapted to movably engage the surface;
a drive component operably connected to the wheels that selectively propels the wheels to move the chassis about the surface;
an extensible lift component, connected to the at least three wheels and the chassis, that selectively moves the chassis between a lowered position, generally proximate the surface, and a raised position, generally spaced away from the surface, wherein the raised position is further from the surface than the lowered position;
the chassis being configured such that when the chassis is in the lowered position, the wheels substantially engage the surface, and when the chassis is in the raised position, the wheels are substantially disengaged from the surface;
a gripping component connected to the chassis for movement therewith that selectively moves with respect to the track between a first position engaging the track, wherein the chassis is substantially fixed against movement with respect to the track, and a second position disengaged from the track, wherein the chassis is permitted to move with respect to the track; and
at least one controller operably connected to the drive component, the lift component, and the gripping component that selectively actuates:
the gripping component to move from the first position to the second position to engage the track;
the lift component to move the chassis from the first position to the second position; and
the drive component to propel the wheels to move the chassis together with the device and the track about the surface to a predetermined location.

\* \* \* \* \*